Sept. 1, 1970  M. ALDEN  3,526,774

SCANNING APPARATUS

Filed March 4, 1968

MILTON ALDEN
INVENTOR.

BY
Norman S. Blodgett

United States Patent Office 3,526,774
Patented Sept. 1, 1970

3,526,774
SCANNING APPARATUS
Milton Alden, Needham, Mass., assignor to Alden Research Foundation, Brockton, Mass., a Massachusetts trust
Filed Mar. 4, 1968, Ser. No. 714,161
Int. Cl. G01n 21/16, 21/32
U.S. Cl. 250—219
6 Claims

ABSTRACT OF THE DISCLOSURE

Generally speaking, the present invention comprises a drum rotatably mounted in the base and formed with a helical light-transmitting band, and a plate having a straight light-transmitting band floating on the surface of the drum with the straight band extending generally parallel to the axis of rotation of the drum.

BACKGROUND OF THE INVENTION

Figure 1:
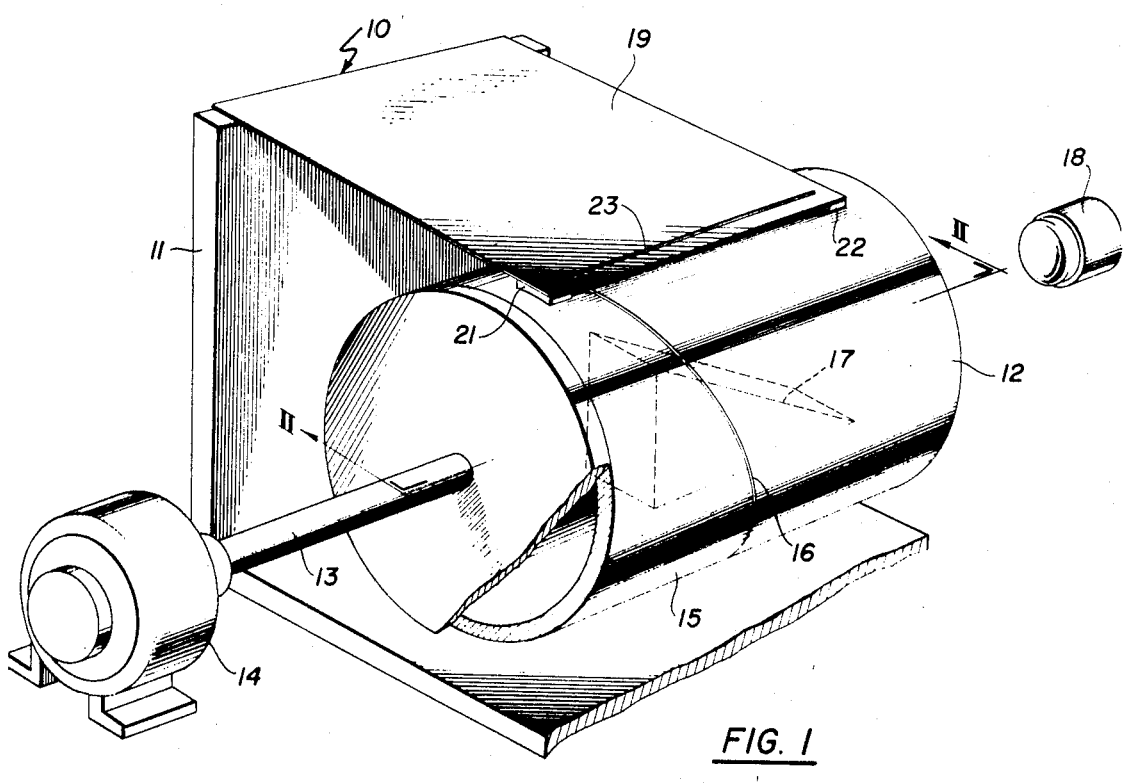

In the field of graphical transmission or facsimile, it is common practice to provide a scanner to read the visual material and to transmit an electrical signal to a recorder where the material is reproduced. Such apparatus is shown in the patents to Nyman No. 2,778,873 and 2,854,509. One acceptable means of scanning involves illuminating the visual material and passing the reflected image through a lens system to a photo-cell where the electrical signal is evolved. Between the lens and the photo-cell it has been the practice to interpose two glass members; one member is a tube which is rotated about its axis and is coated with an opaque substance through which is scribed a helix. The other member is a fixed glass plate which is coated with an opaque substance through which is scribed a straight line parallel to the axis of the tube. The effect of the rotation of the tube with its helix erlative to the plate and its line is a fine aperture between the lens and the photo-cell, the aperture moving axially from one side to the other at a rate determined by the lead of the helix and the rate of rotation of the member. The problem presented by this construction is that, in order to maintain the same size of aperture at all times, it is necessary that the runout of the glass tube be maintained at a very small value; the manufacture of such an accurately-formed glass tube is very expensive. Furthermore, even when the runout is reduced to a very small value, what runout there is causes a variation in the distance between the helix and the line, so that the definition of the signal varies. Also, one attempts to arrange the elements so that the focal point of the lens is located at the aperture; when the location of the aperture along the light beam varies, the amount of light reaching the photo-cell will vary, even though the intensity (indicative of the nature of the material being scanned) remains the same. These and other difficulties experienced with the prior art devices have been obviated in a novel manner by the present invention.

OBJECTS

It is, therefore, an outstanding object of the invention to provide a scanning apparatus in which effective operation takes place without the need for accurately-formed and located parts.

Another object of this invention is the provision of a scanning apparatus having a rotating tube and a fixed plate wherein the distance between the tube and the plate remains the same, despite runout on the tube.

A futher object of the present invention is the provision of a scanning apparatus having a helix and a line combining to provide a traversing aperture wherein the aperture remains at a fixed value.

It is another object of the invention to provide a scanning apparatus having a helix and a line, the distance between the helix and line remaining at a fixed value, despite inaccuracies in the manufacture and location of the elements.

It is a further object of the invention to provide a scanning apparatus wherein the location of the focal point of the light beam relative to the scanning aperture remains constant.

A still further object of this invention is the provision of a scanning apparatus which is not rendered ineffective by rough handling during shipping and other movement.

With these and other objects in view, as will be apparent to those skilled in the art, the invention resides in the combination of parts set forth in the specification and covered by the claims appended hereto.

DESCRIPTION OF THE INVENTION

Figure 2:
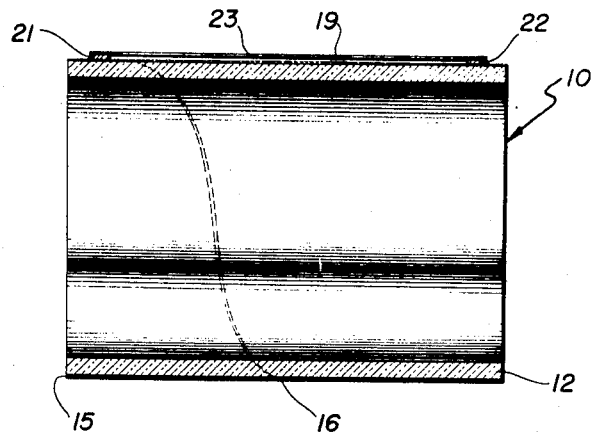

The character of the invention, however, may be best understood by reference to one of its structural forms, as illustrated by the accompanying drawing in which:

FIG. 1 is a perspective view of a scanning apparatus embodying the principles of the present invention, and FIG. 2 is a vertical sectional view of the apparatus taken along the line II—II of FIG. 1.

Referring to the drawings, the scanning apparatus indicated generally by the reference numeral 10, is shown ready for use in a conventional scanner of the type shown in the above-mentioned patent of Nyman No. 2,854,509, having material to be scanned, an illuminating source, a lens system, and a photo-cell. The apparatus is provided with an enclosed container (which is shown open for clarity of understanding) whose inner surface is coated with non-reflective material. Mounted in the container is a first member such as a glass drum 12 which is in the shape of a short tube. The drum is mounted coaxially on and driven by the shaft 13 of an electric motor 14. The outer cylindrical surface of the drum is provided with a coating 15 of opaque material; scribed through the coating is a helical light-transmitting line 16. Inside of the drum and connected to the container so as not to be rotatable with the drum is a mirror 17 which reflects light axially of the drum to a photo-cell 18.

Overlying the drum is a plate 19 formed of a flexible plastic; one edge of the plate extends beyond the center of the drum, while the other edge is rigidly connected to the container. The plate is, therefore, supported as a cantilever, but is flexible enough so that its own weight makes it droop so that the undersurface adjacent the said one edge tends to rest on the drum. The undersurface is prevented from contacting the drum by two Teflon pads 21 and 22. Adjacent the said one edge, the plate is provided with a light-transmitting slot 23 extending parallel to the axis of the drum and having approximately the same width as the helix line 16. In the preferred embodiment, the underside of the plate is provided with a coating of opaque material through which the slot 23 is enscribed.

OPERATION

The operation of the invention will now be readily understood in view of the above description. With the motor 14 operating, the drum 15 is rotated about its axis; a thin film of air will be drawn between the pads 21 and 22 on the one hand, and the surface of the drum on the other hand. Because the plate 19 is formed of relatively thin, light plastic, it will be held in very accurately-spaced relationship with the surface of the drum 12; this means that the distance between the slot 23 and the helix line 16 will also remain fixed. Even if the drum is out-of-round (say, elliptical) or non-concentric with the axis of rotation (runout), the plate will ride toward and away from the axis of rotation, but will always be spaced the same distance from the drum. Even if the generatrices of the surface of the drum are not parallel to the axis, as would be the case if the surface of the drum were in axial misalignment with the shaft 13, the plate will automatically compensate by twisting relative to the end which is connected to the container. It is evident, then, that the drum need not be accurately formed from a geometric point of view and, therefore, can be relatively inexpensive. Furthermore, if the apparatus is subjected to a shock, either during assembly, during shipment, or during use, there is no need for expensive and time-consuming realignment. The plate is able to adapt itself to all manner of inaccuracies in the formation and mounting of the drum. This is quite important, since shipment may be to far-off parts of the world and it is quite expensive to send a skilled technician a long distance to make adjustments. The present invention will result in a reduction in cost of scanning equipment, by the fact that an important element will be reduced in price and the work of aligning during initial construction and after shipment will be greatly reduced. In some cases, the shock which causes mis-alignment can cause the interruption of an important project where technical assistance is not available; this would be the case if the scanning equipment were being used in military operations in a remote part of the world, or in an oceanographic expedition on the high seas. The obviation of the need to make adjustments in the field is particularly important because of the problem of dust in an optical system of this kind. With the present invention, it is possible to assemble the parts in the manufacturing plant in an area particularly designed for dust-free assembly. The interior of the container 11 can be vacuum cleaned and the cover permanently sealed in place. Because of the self-compensating nature of the present invention, it is never necessary to open the container; there is, therefore, no possibility of the introduction of dust. The scanning apparatus will, because of this, operate as well after a long life of service as it does at the time of manufacture.

Because the spacing between the slot and the helix line remains constant, its relationship to the focal point of the lens system of the scanning apparatus is improved. The width of the slot and line need not be as great; in the past, they had to be kept rather wide to compensate for change in relationship with the light beam. With the present invention, therefore, the width can be reduced and the discrimination of the scanner improved.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:
1. Scanning apparatus, comprising:
   (a) a drum rotatably mounted and formed with a helical light-transmitting band, and
   (b) a plate having a straight light-transmitting band and supported to follow the surface of the drum with the straight band extending generally parallel to the axis of rotation of the drum to maintain the distance between the two bands at a constant value.
2. Scanning apparatus as recited in claim 1, wherein the plate is formed of a flexible plastic material.
3. Scanning apparatus as recited in claim 1, wherein the plate is of general rectangular form, wherein one edge is fastened to a support, and wherein the straight band lies close to the opposite edge.
4. Scanning apparatus as recited in claim 1, wherein two pads are located on the surface of the plate, one pad being located adjacent each end of the straight band for contact with the surface of the drum adjacent a corresponding end of the helical band.
5. Scanning apparatus as recited in claim 4, wherein the drum is formed of glass and the pads are formed of Telflon.
6. Scanning apparatus, comprising:
   (a) an element rotatably mounted and formed with a mathematical-curve light-transmitting band, and
   (b) a plate having a straight light-transmitting band supported to follow the surface of the element with the straight band extending generally transversely of the first-mentioned band to maintain the distance between the two bands at a constant value.

References Cited
UNITED STATES PATENTS
2,964,240  12/1960  Brinster et al. _____ 250—219

RALPH G. NILSON, Primary Examiner

M. ABRAMSON, Assistant Examiner

U.S. Cl. X.R.

178—6, 7.6; 250—236